March 30, 1937. J. R. WILLIAMS 2,075,415
TUBE TESTER
Filed June 10, 1931
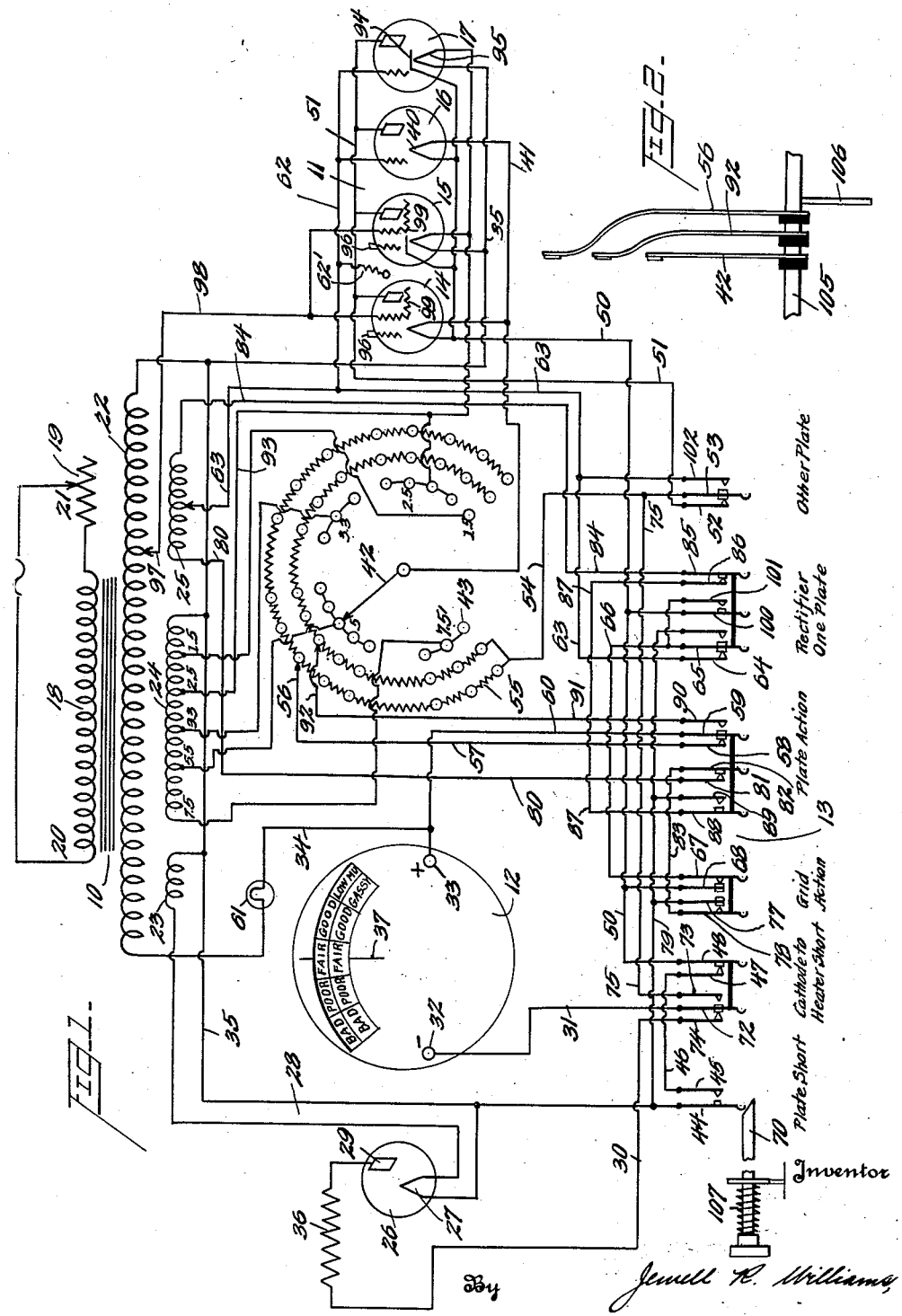

Patented Mar. 30, 1937

2,075,415

UNITED STATES PATENT OFFICE 2,075,415

TUBE TESTER

Jewell R. Williams, Little Rock, Ark., assignor, by mesne assignments, to Jerry H. Glenn, Little Rock, Ark.

Application June 10, 1931, Serial No. 543,467

9 Claims. (Cl. 250—27)

This invention relates to testing apparatus and methods for use in determining the various conditions of vacuum tubes such as those used in radio receiving and transmitting sets, and for various other purposes.

It is a general object of the present invention to provide novel methods of and apparatus for testing vacuum tubes.

In particular, it is an object of the invention to provide a vacuum tube testing apparatus operated entirely by alternating current.

A further object of the invention consists in the provision of apparatus for testing vacuum tubes in which a single meter is used both for determining the testing voltage and for indicating various conditions of the tubes being tested.

An important feature of the invention resides in the provision of a plurality of shunts adapted to be selectively associated with the meter and so adjusted in capacity that for every test the meter will give the same indication for tubes of various characteristics which have the same conditions.

Another important feature of the invention resides in the means for selecting the proper filament voltage for the tube and for consequent automatic selection of a shunt to be used when testing the tube with a positive or negative grid bias.

Another feature of the invention resides in the use of a rectifier and multiplier which permit the voltage of the transformer secondary to be properly adjusted to insure uniformity of results by noting the voltage thereof on the direct current meter used in the set.

Another important feature of the invention resides in the manner of testing for short-circuits between the elements of vacuum tubes wherein a pilot lamp is provided in the plate circuit to indicate such a faulty condition of the tube and to limit the flow of plate current from the transformer to a safe value.

Another feature of the invention resides in the circuit arrangements and the provision of a plurality of switches for automatically placing the tubes in successive circuit arrangement for testing under various conditions and in which a single operator progressively actuates the various switches and maintains each prior operated one in its operated condition as it moves to succeeding switches to operate them.

Another important feature of the invention resides in the provision of a separate grid biasing secondary so arranged that alternating current in phase or counterphase to the plate current can be applied to the tube grid at will for assisting in determining the characteristic of the tube and in which under all conditions the same grid bias is available independent of the filament voltage.

Other and further features and objects of the invention will be more apparent to those skilled in the art upon a consideration of the accompanying drawing and following specification, wherein are disclosed several exemplary embodiments of the invention with the understanding, however, that such changes may be made therein that fall within the scope of the appended claims without departing from the spirit of the present invention.

In said drawing:

Figure 1 is a diagrammatic representation of apparatus for carrying out the method of the present invention; and Figure 2 is a detail of the multiple switch used for connecting the filament to the proper potential and for associating the proper shunts with the meter.

In the testing of vacuum tubes and particularly those used for radio receiving sets, it is highly desirable to provide suitable apparatus whereby tests may be conducted by those with a limited knowledge of electricity, and this apparatus should be as simple and fool proof as possible.

In order to permit testing apparatus to be extremely simple, the present invention has been devised which makes use of a minimum number of parts and yet permits complete and accurate testing of a large number of tube types for all of the characteristics necessary to be known, for the ordinary testing of such tubes for general usage.

The present invention is disclosed diagrammatically for convenience in illustrations and description but it will, of course, be understood that it can be embodied in any desired form, preferably enclosed in a suitable cabinet for use on a counter or in a case for convenient carrying. The exact embodiment of the invention forms no part of the present invention and is in no sense limiting.

In order that the device be as simple as possible, it is constructed to operate solely from a suitable source of alternating current which provides all of the testing potentials. The essential parts of the apparatus then comprise the transformer 10, a plurality of tube sockets 11, a meter 12, suitable circuit associating wiring, and a group of switches 13. The sockets are indicated by the usual diagrammatic showing for vacuum tubes in order to indicate the types of tubes which are intended to be inserted therein. Four of these sockets are indicated though it is obvious that any desired number could be provided and suitably connected. The socket numbered 14 is for use with four element tubes of the screen grid type using direct current on the filament. The socket numbered 15 is for alternating current screen grid tubes in which there is a heater and a separate emission element. The socket numbered 16 represents the usual three element direct or alternating current tube and the socket numbered 17 is for the four element type of alternating current tube using a separate heater and emission element.

All of the potentials for testing are provided by the transformer 10 which has the primary winding 18 having in series therewith the ballast resistor 19 of the variable type. Suitable alternating current of any of the available potentials between 85 and 135 volts is adapted to be applied between the terminals 20, 21 and by adjustment of the ballast resistor provide the desired output potential for testing.

The transformer has four independent secondary windings, that numbered 22 providing the plate and screen grid potentials, that numbered 23 providing filament current for the rectifier tube, later to be described, that numbered 24 being a tapped secondary to provide various potentials for filament lighting and that numbered 25 being a grid-bias secondary winding.

In order that the voltage of the secondary winding 22, or, in fact, any other of the windings of the transformer may be accurately measured and adjusted so that all testing may take place at the same potential, means are provided whereby the meter 12 may be used for the purpose. This meter is a conventional direct current milliammeter of one mil full-scale capacity. To adapt it to measure alternating currents a suitable rectifier such as the tube 26 is provided, having the filament 27 connected by the conductors 28 to the winding 23 and having the plate 29 connected by the conductors 30 and 31 to the negative terminal 32 of the meter. The positive terminal 33 of the meter is connected by the conductor 34 to the left hand end of the secondary 22. The circuit for measuring the voltage of this secondary is completed by the common conductor 35 which connects the right end of the secondary 22 to the filament secondary 23 thereby completing the circuit and permitting the voltage of the secondary to be adjusted by manipulation of the ballast resistor 19. It may be necessary to place a multiplier 36 in the circuit to insure the reading within the range of the meter and preferably the meter is provided with a center line 37 and a suitable legend on the face instructing the operator to adjust the ballast until the needle reaches this line, when the apparatus is in condition for testing. Preferably, the transformer is so wound that a voltage of 150 is delivered by the secondary 22 when 85 volts is effective across the primary 18 and it is the intent to have the resistor adjusted to provide this effective voltage.

The remainder of the apparatus and circuits can best be described by carrying through the series of tests permitted by the apparatus. Suppose, for instance, that a vacuum tube of the type known as U X 201 A be placed in the socket 16, it will be seen that its filament 40 will have one of its terminals connected by the wire 41 to the movable switch arm 42 which is adapted to range over a group of contacts suitably arranged in an arc and connected by the conductors indicated to the various taps on the secondary 24. The first group of contacts 43 are connected to the left hand end of the secondary 24 to provide 7½ volts for tubes whose filaments have this requirement. The next group of contacts and those on which the switch arm 42 is shown resting are connected to the five volt tap etc., in accordance with the requirements of the various types of tubes. The opposite end of the secondary 24 is connected to the common return conductor 35 previously mentioned, which is also secured to the left hand terminal 44 of the first of the switches at the lower part of the drawing. The terminal 45 of this switch is connected by the wire 46 to the terminal 47 of the next switch which is shown in contact with the terminal 48 thereof, which is connected by wire 50 to the opposite terminal of the filament 40.

Since contacts 44, 45 are disengaged the filament will not be lighted, but plate potential is provided for the tube over the wire 51, the closed contacts 52, and 53, wire 54, shunt wires 55, switch arm 56, wire 57, switch contact 58, switch contact 59, wire 60, to wire 34 and the left hand end of the secondary winding 22. The opposite end of this winding is connected, of course, by the common conductor 35 to the filament lighting secondary. Under these conditions no current will flow in the plate circuit, because the filament is not lighted, unless there is a short circuit in the tube between the plate and filament in which case the closed circuit will cause a flow from the plate secondary which will light the filament of the pilot light 61 in the wire 34, which on becoming heated, increases its resistance and forms an effective limiting means for the current. By a similar tracing of circuits it can be seen that the same test is effective with a tube placed in any of the sockets.

If there is a short circuit between the plate and the grid a similar indication will be effected in an obvious manner for the current from the grid flows over the wire 62 to wire 63, contact 64, contact 65, wire 66, contact 67, contact 68, wire 50, back to the filament and then as previously traced to complete the circuit and light the lamp 61. If the tube has no short circuited elements, nothing is indicated and the next test can be carried out.

Some radio tubes do not short circuit until the filament has been lighted when it expands and contacts with certain of the other elements. To indicate such a condition, contacts 44 and 45 are closed to complete the circuit to the filament from the transformer and light the filament as previously described. If the heated filament causes a short circuit in the tube the same indications take place as described in connection with the unlighted filament circuit. If no indication of short circuit is made, the tube is then ready to be tested with the negative grid bias.

All of the switches in the line at the bottom of the drawing are arranged to be closed in succession by means of a suitable actuator 70 which is so arranged that after a switch is closed and the actuator moves to the next, it retains closed all of the preceding switches.

In testing a tube in the socket 16 for its action with a negative grid bias, the actuator 70 moves over the first switch which closes the filament circuit and then over the second switch which is intended only for testing tubes with a separate heater and is marked "Cathode to heater short" and then passes on to the third switch marked "Grid action" opening the contacts 67, 68 and closing the other two contacts thereof. Under these conditions the meter terminal 32 is connected by the wire 31 to the switch spring 72 now in contact with the spring 73. The switch contact 72 is out of engagement with the contact 74 which removes the rectifier tube from the circuit leaving its filament lighted, however. The plate circuit of the tube to be tested is now from the left end of the secondary 22, through the wire 34, through the meter 12, through the wire 31, to the switch contact 72, to contact 73, to wire 75, to contact 53, to contact 52 and wire 51 to the tube plate which places alternating current on the plate after the filament is lighted. The only current flowing, however, will be the positive half of each alternation owing to the rectifying action of the tube so that a direct pulsating current flows which will actuate the direct current meter 12.

The current from the plate flows through the electrons in the tube to the filament 40 and over the wire 50 to the contact 68 now separated from 67 and in engagement with 77 and 78. From contact 77 current flows in the wire 79, to the wire 35 which returns it to the common conductor between the filament and plate secondaries. This flow of current is governed by the density of the electron flow and the effect of the grid potential. Negative voltage on the grid repels the electron flow consequently decreasing the amount of current possible to flow from the plate to the filament.

In order to apply negative potential to the grid and yet use alternating current, it is necessary to so phase this current that it is counter to the phase of the current delivered to the plate. This is effected by the secondary winding 25, an intermediate point of which is connected by the wire 63 to the grids of all of the tubes. Contact with the control grids of the screen grid tubes is by the flexible conductor and clip 62'. With the windings of all the secondaries in the same direction it becomes necessary to use the section at the left of the intermediate tap and this is connected by wire 80 to switch contact 81 in engagement with contact 82 connected by wire 83 to the contact 78 which is now in contact with the contact 77 which leads back to the common conductor 35 as previously mentioned, thereby placing a negative potential between the filament and grid and permitting the measurement of the current flow in the plate circuit to indicate the condition of the tube particularly for filament emission.

As was previously mentioned, an important feature of this invention resides in having the meter read at the same indication for the same condition of tubes having different plate current capacities and in order to effect this result, it is necessary to shunt the meter with various shunts so adjusted as to insure this positioning of the needle for the various current flows. This is effected automatically by arranging the shunts in connection with contacts concentric with the contacts for the adjustment of filament voltage and insuring the movement of the pointer over these contacts automatically as the filament voltage is adjusted. Since there are several tubes using the same filament voltage, but which use different plate currents, there will be a number of taps for the shunts for each set of filament voltage taps, and in some desirable manner the operating mechanism for the movable switch arms will be provided with indicating means so that they can be set for the particular tube being tested and in so setting will provide the proper filament voltage and associate the correct capacity shunt with the meter.

The meter is preferably devoid of the usual graduated scale and in place thereof has marked thereon Bad—Poor—Fair—Good—Gas. Every type of tube in proper condition will give an indication of Good when tested as just described, and the shunts are so arranged as to produce this result.

The shunts in the outer ring and marked 55 cooperate with the meter when making a test with negative grid bias and these shunts are connected between the contact buttons indicated which are engageable by the switch arm 56 which moves in unison with the filament voltage switch arm 42. The proper value or shunt between the common lead 54 and the various contacts is determined by fitting the proper socket with a laboratory standard tube and adjusting the amount of shunt until the meter reads Good. Owing to the different characteristics of the various types of tubes it may not be possible to provide a continuous tapped shunt as shown but separate shunts may be required leading from each contact to the common terminal 54 as will be clearly understood. It will be seen that the shunt will be placed across the terminals of the meter when the third of the sequence of switches is closed, for the wire 69 leading from the terminal 33 of the meter is connected to the switch contact 59 which is in engagement with the contact 58 connected by the wire 57 to the movable switch arm 56 at one end of the selected quantity of shunt. The opposite or common terminal of the shunt is connected by the wire 54, wire 75, contact 73 now in engagement with the contact 72 and wire 31 to terminal 32 of the meter.

If after calibration some other tube is placed in the socket and the shunt set as originally calibrated for that type tube the needle may point to any of the designations on the meter according to the flow of plate current which is controlled by the condition of the tube. If the tube has a gas content the grid cannot repel electrons as in a vacuum and a greater amount of current will flow causing the needle to swing over to the section of the scale marked Gassy. The same calibration procedure is gone through for all other types of tubes.

The next test to be made is that of tube operation when a positive or in-phase voltage is impressed on the grid and this is done by moving the progressive switch operator 70 to operate the fourth switch marked Plate Action. Moving the fourth switch opens contacts 81, 82, removing the left hand end of the grid bias secondary from the circuit. At the same time the opposite end of this winding 25 is connected to the two grids through the wire 84, closed contacts 85, 86, wire 87, contacts 88 and 89, now closed, to wire 79 leading to wire 30 and back to the common conductor 35. This places on the grid a positive or in-phase voltage impressed at the same time the plate of the tube is positive for the grid bias section of the secondary now in use is wound in the same direction as the plate current secondary. When the grid is positive it aids the flow of electrons and hence there is a greater current flow between the plate and filament. For this reason the same shunts that were used for the negative grid condition cannot be used for reading the current flow with positive grid bias so a new set of shunts is installed which occur in the drawing intermediate the shunts first discussed and the row of contacts for the filament voltage. At one end they are connected to the common conductor 54. They are calibrated in exactly the same manner as discussed in connection with the shunts used for the negative grid test. They are placed in circuit as follows: From the terminal 33 of the meter, over the wire 69 to the contact 59 now closed against contact 90, over the wire 91 to the movable switch arm 92 for the intermediate row of shunts, then through the proper shunt to the wire 54, wire 75, contact 73, closed to contact 72, and wire 31 to terminal 32 of the meter, thus shunting it with a shunt adjusted in accordance with the type of tube being tested. As in the previous test any tube of unknown quality can be tested by placing it in the proper socket after the shunts have been properly adjusted by the use of standard tubes. If the tube being tested has a low plate impedance or high mutual conductance the effect will be to allow more current to flow than usual and the needle of the meter will move to the right or past the division marked Good and will show "Low mu."

When the device is used for an alternating current type of tube using a separate heater which heats a cathode to give off electrons such a tube is placed in the socket 17 and the heater is immediately lighted because it will be seen that there is a completed filament circuit therefor through the common wire 35 on one side and the wire 93 leading from the 2½ volt tap from the filament transformer. If the tube has an internal short from plate to other element the same action will take place as described for the four element tubes and the pilot light lights as an indicator. The tube has already been heated so it is not necessary to hesitate with the progressive switch operator on the first switch. If no short is indicated, the shunt rotor is rotated until its pointer indicates the marking on the panel for the heater type tube being tested.

Heater type tubes sometimes have a short between the cathode 94 and the heater 95. If such a short occurs it is determined by moving the progressive switch operator so the "Cathode to heater short" contacts are actuated. This removes the rectifier from the circuit as previously described and connects the terminal 32 of the meter to the wire 75 which leads to the wire 54 connecting to the common point of the shunts. The wire 54 through the contacts 53 and 52 and the wire 51 is connected to the plate of the tube. The terminal 33 of the meter is connected by the wire 60, the contacts 59 and 58 and the wire 57 to the movable contact 56 on the outer row of shunts. This terminal is also connected by the wire 34 to the left hand end of the plate secondary 22 which places potential on the plate. The circuit is not closed, however, so that there can be a flow and indication on the meter because there is no filament in the tube and the heater 95 which is connected to the filament winding and would normally provide the return through the common ground 35 does not receive the flow of electrons which travel to the cathode 94 and this is normally out of contact with the heater and with the common ground as can be seen by tracing its wire 50 to the open contacts between the springs 47 and 48. If, however, there should be a short between the heater and the cathode, then the circuit would be closed and an indication on the meter would be a showing of a short circuit between these elements.

If there is no such indication, the tests for grid action and plate action are carried out the same as explained in connection with tubes in the socket numbered 16.

Two sockets are provided for screen grid tubes, one 14 for the direct current type and one 15 for the alternating current type using a cathode and heater. By using separate sockets for these tubes because of the connection of the screen grid to the socket terminal normally connected to the control grid of other tubes, complicated switches are eliminated. It has already been explained that the control grid is connected by the clip 62' secured to the cap 96 at the top of the tube.

In testing these screen grid tubes, the test differs only from the corresponding test for the same type tube without the screen grid, in the furnishing of a screen grid voltage in phase with the plate voltage but of a lower potential, and this is readily accomplished by tapping off the plate voltage secondary at an intermediate point 97 and running the wire 98 to the screen grids 99. The calibrations for the shunts for these tubes and the tests are conducted in the same manner as described heretofore and the screen grid positive potential governs any changes in calibration so that the indications are the same as with the other type tubes.

In order to provide for testing filament type rectifiers such as those with two plates giving full wave rectification and those with one plate giving half wave rectification, these tubes are used with the socket 16. We will consider only the full wave rectification tubes since the test for one plate in that type tube would be identical with the test for a half wave rectifier tube.

The test for a rectifier tube is the current flow from plate to filament which is in turn dependent on the filament emission. With the tube in the socket the progressive switch is moved to close all the switches up to and including that marked "Full wave rectifier—One plate". This opens contacts 64, 65 which disconnects the wire 63 and in spite of the closing of contacts 100, 101 removes the grid connections from the circuit. The plate which then corresponds to the plate of the tube shown in the socket 16 is normally connected to the shunt 55 by the common wire 54, the contact 53, contact 52, wire 51 to the plate. The meter is connected to the shunt as described in connection with the plate test with positive potential on the grid. The movable contact 92 for the intermediate shunt is adjusted to the proper position for the tube being tested and if the shunt has been previously properly calibrated the quality of the tube will be indicated by one of the indicia on the meter face.

In order to read the current flow from the other plate of a full wave rectifier, it must be remembered that its socket prong is received in the socket contact which is normally connected to the grid wire 62 but by moving the progressive switch to open the contacts 52, 53 and close 53, 102 this grid wire 62, 63 is transferred into contact with the wire 54 which leads to one end of the shunt and therefore the plate in the rectifier tube is properly connected to the meter in order that the current flow to the plate can be determined.

In Figure 2 is seen schematically an arrangement for the three movable arms, 42 for the filaments; 92 for the shunts for plate current with positive grid bias; and 56 for plate current measurement with negative grid bias. They can be mounted on and insulated from a single shaft 105 which can be rotated so that the pointer 106 swings over a scale having indicia thereon indicating the various tubes.

The actuator 70 for the progressive switch is preferably biased by a spring 107 to always return to the off position so that before each tube is tested there is an assurance that the switches are in normal position and will pass progressively to the various positions for the proper sequence of tests.

The provision of the adjustable shunts makes this testing apparatus highly desirable in that it provides a scale on the meter which can be read by those unskilled in the electrical art and permits tubes to be properly tested by any one who can read. No knowledge is needed of the desired amount of plate current for the various type tubes, for any tube tested in this apparatus will give an indication on the meter of its exact condition in language readily understood. It will be appreciated that details of construction can be varied to suit the conditions and have no bearing on the main features of the invention.

Having thus described the invention, what is claimed as new and desired to be secured by Letters Patent is:

1. In a vacuum tube tester in combination, a transformer having filament lighting means tapped for various tube filaments, and a plate exciting means, grid biasing means, a tube socket, circuits associating said means and socket, a milliammeter in the plate circuit, a plurality of shunts for said meter, means to concurrently adjust the filament voltage for the type tube being tested and connect a shunt to the meter such that the meter gives the same indication for similar conditions of all types of tubes.

2. In a vacuum tube tester in combination, a transformer having a filament lighting secondary tapped for various tube filaments, a plate exciting secondary and a grid biasing secondary, a tube socket, circuits associating said windings and socket, a milliammeter in the plate circuit, a plurality of shunts for said meter, means to concurrently adjust the filament voltage for the type of tube being tested, and connect a shunt to the meter such that the meter gives the same indication for similar conditions of all types of tubes, and means to apply current from the grid biasing secondary to the tube grid in phase with the plate current and out of phase therewith at will.

3. In a vacuum tube tester, in combination, a transformer having a filament lighting secondary tapped for various tube filament voltages, a plate current secondary and a grid biasing secondary, a tube socket, circuits associating said socket and secondaries and including a plate current milliammeter, two sets of shunts for said meter, means to select the proper filament tap for the type tube to be tested, means automatically actuated upon said selection to select two shunts for use with said meter, means to connect said bias secondary to the grid in counter phase to the plate current and to connect one of said shunts to the meter and means to connect said bias secondary to the grid in phase with the plate current and to connect the other selected shunt to the meter, each shunt being selected for its respective type of tube to give identical readings for all tubes of like condition and for both grid bias conditions.

4. In a vacuum tube tester, in combination, a plurality of tube sockets for different type tubes, a transformer having a primary winding, a tapped filament lighting secondary, a plate current secondary, and a separate grid bias secondary, a meter, a plurality of circuits associating the tube sockets, secondaries and meter, a plurality of switches to variously associate said parts and circuits for a series of tests of a tube in the socket, said switches being arranged to close the circuits in sequence to effect the tests in a definite order, and means to successively close and hold closed the switches.

5. In a vacuum tube tester, in combination, a multiple switch including a filament voltage adjusting means having several positions for each filament voltage, and a meter shunt selecting means automatically moved with the filament voltage adjusting means to select a shunt for a particular tube for each position of the filament voltage adjusting means.

6. The method of testing vacuum tubes of different characteristics in a tester including a source of adjustable alternating filament potential, a source of alternating plate potential, a source of grid potential, a measuring instrument, and an adjustable shunt, comprising energizing the tube filament at the proper potential, applying the plate potential thereto, inserting the measuring instrument in the plate circuit, exciting the grid from its source of potential, inserting the shunt in parallel to the instrument and adjusting it to a predetermined value for the particular tube, and noting the deviation of the instrument from a fixed indication for all types of tubes.

7. The method of testing vacuum tubes of different characteristics in a tester including a source of adjustable alternating filament potential, a source of alternating plate potential, a source of alternating grid potential, a measuring instrument, and an adjustable shunt, comprising energizing the tube filament at the proper potential, applying the plate potential thereto, inserting the measuring instrument in the plate circuit, exciting the grid from its source of potential in phase opposition to the plate potential, inserting the shunt in parallel to the instrument and adjusting it to a predetermined value for the particular tube, and noting the deviation of the instrument from a fixed indication for all types of tubes.

8. The method of testing vacuum tubes of different characteristics in a tester including a source of adjustable alternating filament potential, a source of alternating plate potential, a source of alternating grid potential, a measuring instrument, and an adjustable shunt, comprising energizing the tube filament at the proper potential, applying the plate potential thereto, inserting the measuring instrument in the plate circuit, exciting the grid from its source of potential in phase with the plate potential, inserting the shunt in parallel to the instrument and adjusting it to a predetermined value for the particular tube, and noting the deviation of the instrument from a fixed indication for all types of tubes.

9. In an audion tube tester; the combination with a normally de-energized transformer having its primary and secondary windings arranged to deliver voltages of various fixed values; of an electrical network; a plurality of selector switches connected in the network and to the transformer and to the elements of an audion tube; an electrical measuring means connected in said network; a single manipulative device simultaneously to set all of the selector switches thereby applying the proper voltage to each element of said tube; and means to energize the transformer and to alternately impress different voltages on a certain one of the tube elements to test the electrical condition of said element.

JEWELL R. WILLIAMS.